Feb. 17, 1948.    J. KNAPP    2,436,173
FRUIT GATHERER
Filed Dec. 12, 1945

Inventor
John Knapp

By Clarence A. O'Brien
and Harvey B. Jacobson
Attorneys

Patented Feb. 17, 1948

2,436,173

UNITED STATES PATENT OFFICE 2,436,173

FRUIT GATHERER

John Knapp, Holland, Mich.

Application December 12, 1945, Serial No. 634,511

4 Claims. (Cl. 56—329)

This invention relates to a device for gathering fruit in a practical and economical manner, more particularly for use in large orchards with a great number of fruit trees, such as cherries, plums, peaches, pears and apples which are easily and permanently injured if permitted to fall on the ground, and thus spoiled for the market.

Accordingly, a great saving for the farmer will result, not to mention saving of time and labor and giving the assurance of getting a large harvest of unspoiled and attractive looking crop of whole fruit.

Another advantage in using this device resides in avoiding handling of the fruit by hand, which often causes spoiling and injuring of the fruit particularly berries and such fruit which has a soft pulp and tender skin.

Other advantages will be understood from the reading of the following description with the aid of the accompanying drawing in which.

In the figures like reference numerals denote like details of the device.

Figure 2:
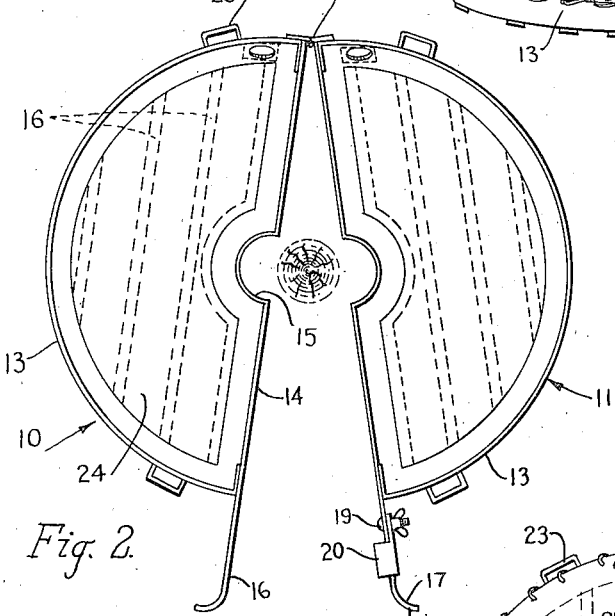
Figure 2 is a top plan view of the gatherer open and ready for placing around the trunk of the tree.
Figure 6:
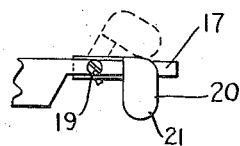
Figure 6 is a fragmentary side elevation of the locking device between the two halves as seen from the left of Figure 3.
Figure 5:
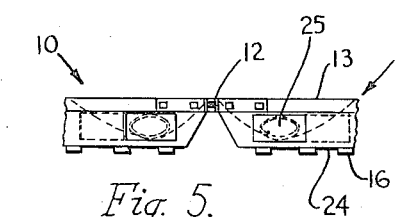
Figure 5 is a fragmentary elevation of the hinged end of the device in Figure 3 showing openings for emptying the pan.

The fruit gatherer or berry picker consists of two main parts, a left hand half 10 and a right hand half 11 which are hinged together at 12 for outward swinging into the open position shown in Figure 2.

Figure 1:
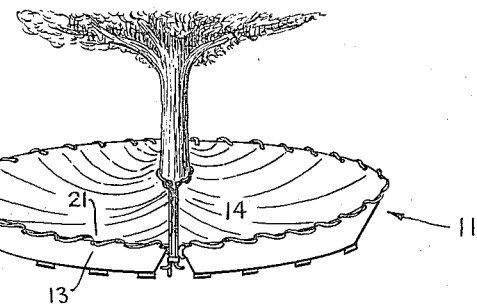
Figure 1 represents a perspective view of a fruit tree ready for picking with a gatherer of the present invention placed below it ready for collecting the fruit caused to fall from it.
Figure 3:
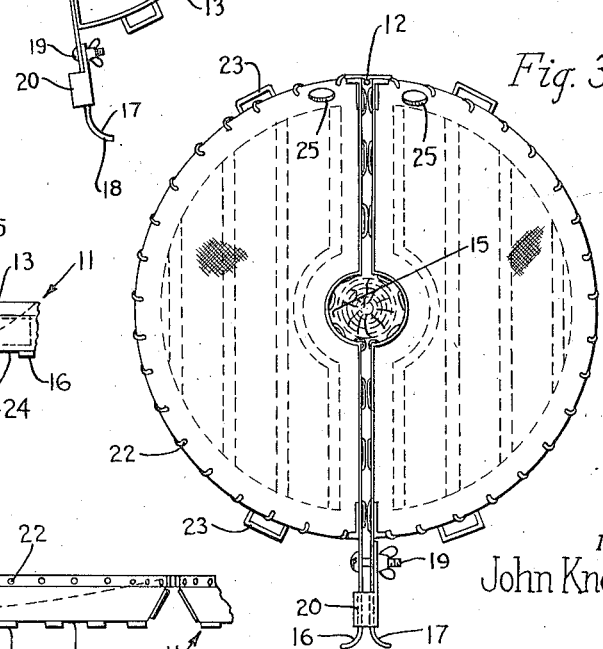
Figure 3 is a similar view of the gatherer placed around the tree trunk and locked in position.
Figure 4:
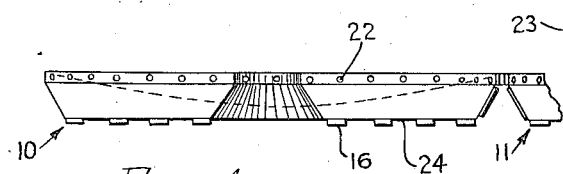
Figure 4 is a fragmentary edge view of Figure 2.

Each half 10 and 11 is made of sheet metal forming a half-moon pan or receptacle, that is, having a semi-circular outer edge or wall 13 and a substantially straight diametrical, inner edge or wall 14 from which the pan tapers down to a flat bottom 24, completely filling the space between said edges. At the exact center an outward semi-circular bulge 15 is formed in the straight edge of each half, so that when the pan is closed as in Figures 1 and 3, a circular opening large enough to fit around the trunk of a tree to be picked as indicated in Figure 1 is formed.

The underside of the bottom 14 of the pan is reinforced by metal or wooden flat strips 16 reaching right across the pan. At the open end of each pan half is provided an arm 16, 17 having an outward bend 18 at its extremity and near the edge 13 the arm 17 carries a hinge bolt 19 with a lock nut for a swinging latch member 20. This latch member has two spaced, flat leaf members 21 adapted to straddle the arms 16, 17 when closed to lock the two pan halves 11, 13 together in closed position. The tightening of the wing nut on bolt 19 assures the retention of the pan in locked position.

Each half pan section 10, 11 is covered on the inside and bottom with canvas 21 or similar material to soften the fall of the fruit. For securing or lacing the canvas in each pan 10, 11 a series of perforations 22 are provided around their edges 13.

For the convenience of carrying the pan, each half is provided with grips or handles 23 in front and rear.

Each half 10 and 11 of the pan is provided near the hinge 12 with an opening 25 for emptying the pan and this is normally closed by a slide 26 pushed across during the fruit gathering procedure.

In operation the pan is placed under a fruit tree as seen in Figure 1 with the tree trunk in the central opening 15 and the halves swung together and locked by the latch member 20 pressing the arms 16, 17 tightly together and secured by the wing nut 19. The fruit is then caused to fall on the canvas, subsequently, after the pan has been filled, the slide 26 is pushed back from the openings 25 to permit the removal of the fruit.

It is to be understood that the invention as here disclosed is not limited to the details here described and shown but that the same may be varied without departing from the spirit of the invention as defined by the subjoined claims.

I claim:

1. A fruit gathering pan consisting of two semi-circular halves hinged together at one end of a diametrical line and having locking means at the opposite end, each half having a straight side wall with a central bulge along said diametrical line, an arcuate side wall joining said straight side wall, both sides tapering down to a flat bottom forming a unit therewith, each half having an opening in the side wall for emptying and a sliding door therefor, said locking means consisting of a hasp with two spaced leaves adapted to grip corresponding end projections on said straight side wall to hold them together and a hinge bolt with a lock nut for said hasp on one of said projections, said pan being made of sheet metal with reinforcing strips underneath the bottom, and a canvas cover over the entire bottom and sides of each half, the side edges of each pan being provided with a series of apertures adapted for lacing to secure said canvas cover.

2. A fruit gathering device comprising a pair of receptacles having an arcuate wall and a substantially straight wall, means for hingedly connecting said receptacles, a portion of said straight walls extending from the edge of said arcuate walls, latch means associated with said portions, covers, means for securing said covers to said receptacles, apertures in said arcuate walls, apertures in said covers, closure means slidably secured to said arcuate walls and registering with said apertures.

3. A fruit gathering device comprising a pair of receptacles having an arcuate wall and a substantially straight wall, means for hingedly connecting said receptacles, a portion of said straight walls extending from the edge of said arcuate walls, latch means associated with said portions, covers, means for securing said covers to said receptacles, apertures in said arcuate walls, apertures in said covers, closure means slidably secured to said arcuate walls and registering with said apertures, said latch means including a hasp pivoted to a selected portion lockingly engaging a second portion.

4. A fruit gathering device comprising a pair of receptacles having an arcuate wall and a substantially straight wall, means for hingedly connecting said receptacles, a portion of said straight walls extending from the edge of said arcuate walls, latch means associated with said portions, covers, means for securing said covers to said receptacles, apertures in said arcuate walls, apertures in said covers, closure means slidably secured to said arcuate walls and registering with said apertures, said cover securing means including lacing associated with said covers secured to said arcuate walls and said straight walls.

JOHN KNAPP.

REFERENCES CITED

The following references are of record in the file of this patent:

UNITED STATES PATENTS

| Number | Name | Date |
| --- | --- | --- |
| 1,058,241 | Jensen | Apr. 8, 1913 |
| 1,371,999 | Allshouse | Mar. 22, 1921 |
| 1,415,863 | Boelman | May 16, 1922 |